April 13, 1954 W. H. CLARK 2,675,024
VALVE WITH EXPANDING RING SEAL
Filed Jan. 7, 1950 2 Sheets-Sheet 1

INVENTOR
WARREN H. CLARK.
BY J. E. Beringer
His ATTORNEY

April 13, 1954 W. H. CLARK 2,675,024
VALVE WITH EXPANDING RING SEAL
Filed Jan. 7, 1950 2 Sheets-Sheet 2

INVENTOR
WARREN H. CLARK.
BY J E Deringer
HIS ATTORNEY

Patented Apr. 13, 1954

2,675,024

UNITED STATES PATENT OFFICE 2,675,024

VALVE WITH EXPANDING RING SEAL

Warren H. Clark, Glendale, Calif., assignor to United Aircraft Products, Inc., Dayton, Ohio, a corporation of Ohio Application January 7, 1950, Serial No. 137,384

11 Claims. (Cl. 137—622.5)

This invention relates to hydraulic or pneumatic control valves, having special reference to sealing arrangements and devices forming part of the valve assembly.

Of the two basic types of valves, poppet and slide, the former has little use in high pressure systems due to the force required to lift the poppet valve against the pressure of the fluid. A slide valve is relatively unaffected by pressure but it is difficult positively to preclude leakage around the valve. Moreover, it is subject to inadvertent shifting due to vibration and other causes. Peripheral ring seals commonly are used to seal slide valves, but this has heretofore involved a comprise between tight sealing to inhibit leakage and inadvertent shifting, and loose sealing to avoid cutting of the seals as they move across the part to be controlled.

It is proposed by the instant invention to combine the advantage of the slide valve at high pressures with the positive sealing of the poppet valve. It is further proposed to avoid the necessity for a compromise between tight and loose sealing, it being contemplated that the benefits of both shall be achieved.

In carrying out such proposals there is utilized a principle of expansible ring sealing wherein, at the will of the operator, a ring seal may alternatively be expanded or be allowed to retract into a peripheral groove on the valve. In accordance with the invention, therefore, the ring seals may be forced out into tightly sealing position, when the valve has been selectively adjusted, and may be released to sink into their respective grooves preparatory to and during motion of the valve from one control position to another.

According to a feature of the invention pressure fluid from the system is selectively drawn upon to provide the force for expansion of the ring seals.

According to another feature of the invention a control for the pressure fluid expansion of the seals is provided which is physically associated with the control for adjustment of the valve whereby the two may be easily operated together, as by one hand of an operator.

As shown in Figs. 1 to 4 of the drawings, the invention is disclosed as applied to a slide valve in a four way valve unit as used in hydraulic systems to control the extension and retraction of a piston in a hydraulic cylinder. Such systems have many applications. In aircraft, for example, they are used to raise and lower wing flaps, extend and retract landing gear, and to perform other like duties under remote control.

Figure 5:
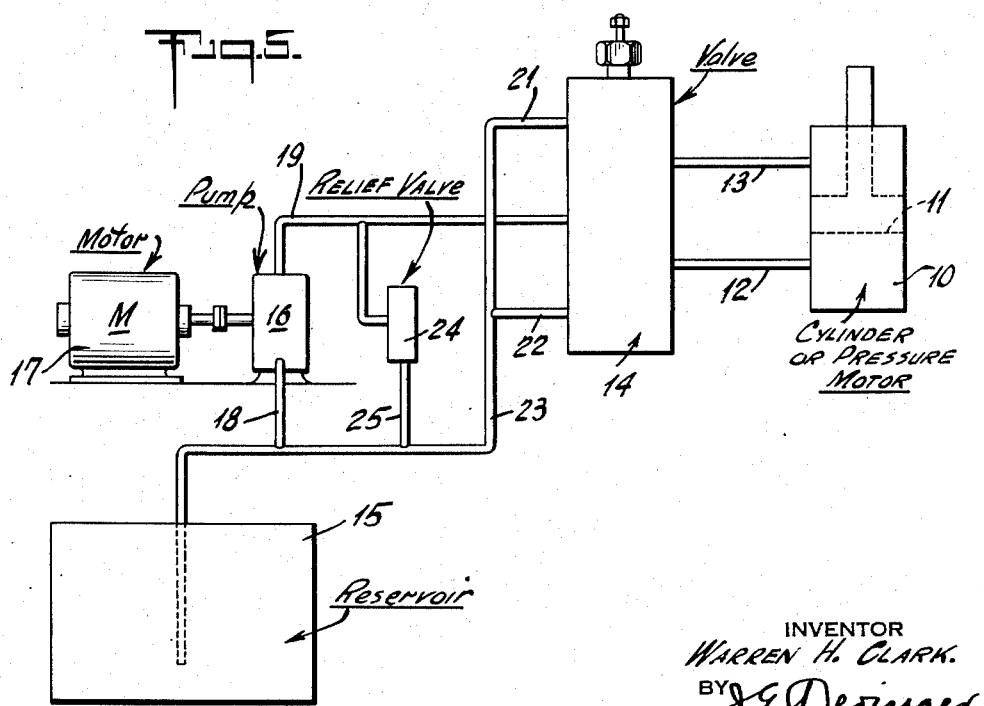
Fig. 5 is a diagram of a typical hydraulic installation incorporating a control valve of a kind to which the instant invention is applicable, the prior figures being based for illustrative purposes upon the diagram of Fig. 5.

A typical installation is shown in diagram form in Fig. 5 wherein a cylinder 10 mounts a piston 11 to be extended by pressure fluid admitted through a conduit 12 and to be retracted by pressure fluid admitted through a conduit 13, each said conduit becoming under control of a valve unit 14, alternately a pressure fluid inlet and an outlet for return flow back to the system. The fluid used in the system ordinarily is an oil contained in a reservoir 15. A pump 16, driven by a motor 17 draws oil from the reservoir by way of a conduit 18 and delivers it through a conduit 19 to the valve unit 14 where it is directed alternatively to the conduits 12 and 13. Return flow from the cylinder 10 takes place through a conduit 12 or 13 back to the valve unit 14 where it is directed through one or the other of a pair of escape lines 21 and 22 to a conduit 23 returning to the reservoir 15. The valve 14 may be located for convenient operation, and, by its adjustment, the continuously operating pump 16 is caused to put the piston 11 through extending and retracting strokes, as desired.

The system may further incorporate, as shown, a pressure relief valve 24 interposed in a line 25 interconnecting supply conduit 19 and return flow conduit 35, it being understood that conduits 19 and 23 represent respectively the high and low pressure sides of the system.

Referring now to Figs. 1 to 4, the valve unit 14 comprises a body 26 presenting a through longitudinal bore 27 and a plurality of lateral ports communicating with the bore 27. The lateral ports include a central or high pressure port 28 receiving fluid under pressure, as from the conduit 19 of the installation of Fig. 5. Further included are ports 29 and 31 connected to the opposite ends of the hydraulic cylinder, as by conduits 12 and 13; and ports 32 and 33 representing return flow connections, as to lines 21 and 22. The several ports 28—33 open into the bore 27, the ports 29 and 31 by way of respective annular grooves 34 and 35. In accordance with the diagram of Fig. 5, port 28 occupies a central position on one side of body 26, with ports 32 and 33 in spaced flanking relation on the same side of the body. Ports 29 and 31 are on the opposite side of the body occupying respective positions intermediate port 28 and the ports 33 and 32.

Controlling flow between the several ports 28—33 is a slide valve 36 reciprocably mounted in the bore 27. The slide valve is designed selectively to interconnect the several ports and may be described as having a diameter less than the diameter of the bore 27 and being formed with a series of longitudinally spaced apart bearing flanges 37, 38, 39 and 41 in sliding contact with the wall of the bore. In effect there is thus formed between the flange 37 and the flange 38 an annular recess 42, between the flange 38 and the flange 39 an annular recess 43; and between the flange 39 and the flange 41 an annular recess 44. The flanges 37 and 41 represent end bearings for the slide valve and carry peripherally recessed ring seals 45 to inhibit a flow of hydraulic fluid therearound. The flanges 38 and 39 also function as bearings but serve a further purpose in that they are movable from side to side of the ports 31 and 29 to connect these ports alternatively to the high pressure port 28. Peripherally recessed in these flanges are flexible ring seals 46.

The opposite ends of bore 27 are closed by screwed in bushings 47 and 48, the latter having a small diameter opening 49 therein to prevent the entrapment of air beyond end flange 41 of the slide valve. The bushing 47 has a larger opening to accommodate a tubular extension 51 on the slide valve which projects through the bushing outside the body 26. Extension 51 has a loose fit in bushing 47 to avoid entrapment of air between the bushing and end flange 37. Mounted on the projecting outer end of extension 51 is a knob 52 for hand shifting of the slide valve 36.

The ring seals 46 in the flanges 38 and 39 are required to confine high pressure from the bore 28. In accordance with the instant invention positive sealing of the rings 46 is contemplated by an alternative expansion thereof against the wall of bore 27. To this end the ring seals 46 are mounted in recesses 53 having a depth greater than the thickness of the seals. In an unexpanded condition the seals lie within the recesses 53, beneath the peripheral surface of the flanges 38 and 39. So positioned, the seals offer no resistance to axial motion of the slide valve and further are protected from being scarred or cut as the flanges 38 and 39 pass the annular grooves 35 and 34. In an expanded condition the seals 46 are pressed tightly against the wall of bore 27. So positioned, they positively prevent an escape of pressure fluid around the flanges 38 and 39 and further act as detents, inhibiting inadvertent shifting of the slide valve, as might result from vibration.

Expansion of the ring seals is accomplished by fluid pressure admitted to the recesses 53 by radial openings 54 communicating with a longitudinal bore 55 in the slide valve. Other radial grooves 56 communicate the bore 55 with annular recess 43 in the slide valve. The bore 55 is drilled from the inner or right hand end of the slide valve, the outer end thereof being closed by a screw plug 57. At its inner end the bore 55 communicates with one end of a smaller diameter bore 58, the bore 55 being a counterbore with respect to bore 58. The opposite end of bore 58 communicates with another counterbore 59 opening into a chamber 61 in the slide valve extension 51. The chamber 61 is connected by an opening 62 with annular recess 42. Screwed into counterbore 59 is a bushing 63 presenting an opening 64. Also within counterbore 59, beyond bushing 63 is a compression spring and guide assembly 65 urging a ball valve 66 to a seat in opening 64. For unseating the ball valve 66 there is mounted in the chamber 61 a piston 67 having on its inner end a plunger 68 received in bushing opening 64. The outer or opposite end of piston 67 is provided with a push rod 69 extending through and beyond slide valve extension 51 and knob 52 thereon. To push rod 69, and thereby to move piston 67 axially inward, will result in plunger 68 engaging and unseating ball valve 66. Normally, the ball valve is held seated by spring assembly 65 which also provides a force for return of the piston 67 and rod 69 axially outward.

Figure 1:
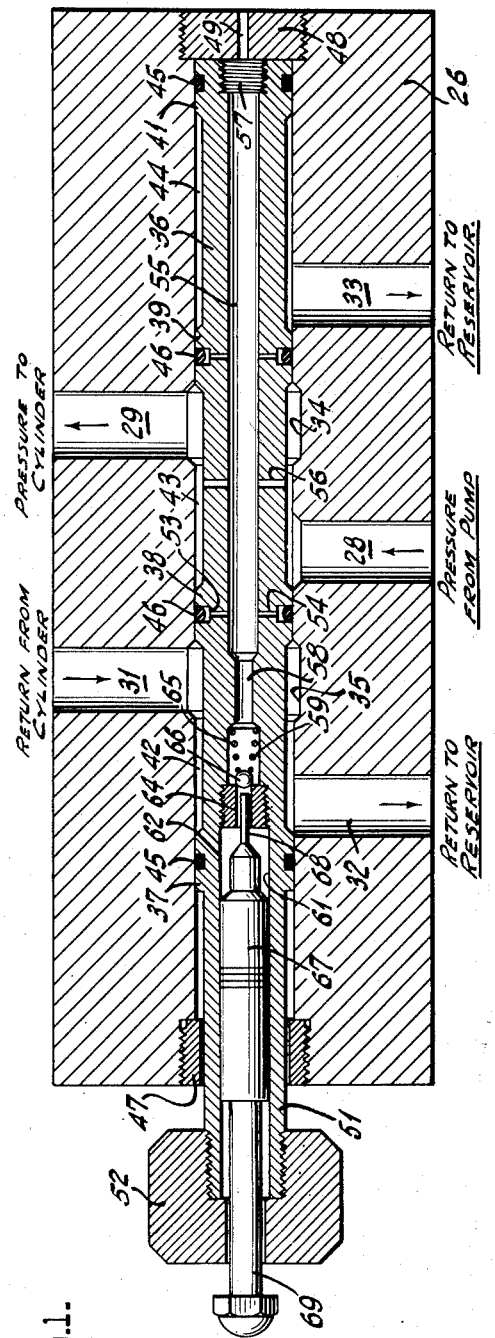
Fig. 1 is a partly diagrammatic view, in longitudinal section, of a hydraulic valve in accordance with the instant invention, the ring seals being expanded.
Figure 3:
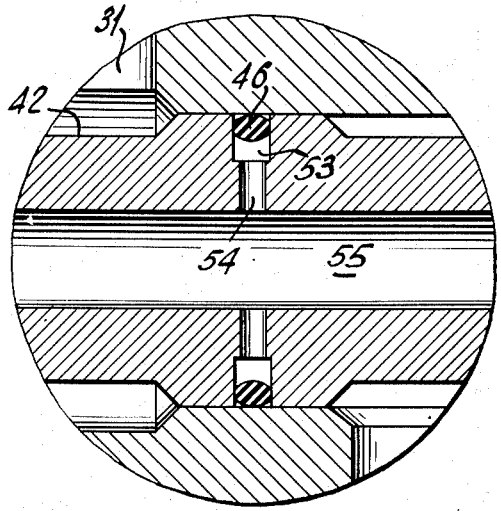
Fig. 3 is an enlarged detail view of a ring seal and its mounting, taken from Fig. 1.
Figure 4:
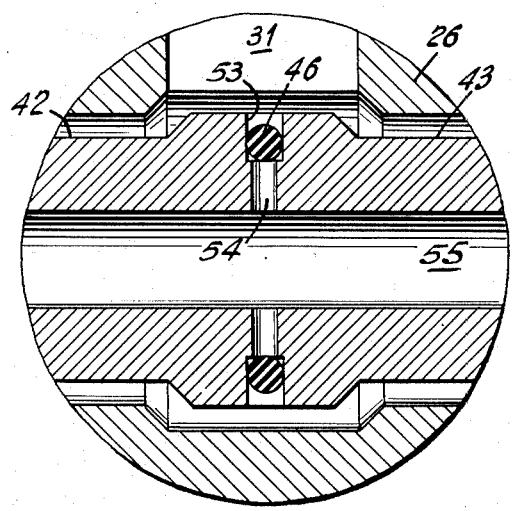
Fig. 4 is a view similar to Fig. 3, taken from Fig. 2.

In the operation of the device, pressure fluid is continuously supplied the valve body through port 28. With the slide valve 36 positioned as shown in Fig. 1, wherein flanges 38 and 39 occupy positions on opposite sides of the port 29, port 28 is connected around annular recess 43 to port 29. At the same time, and since flanges 37 and 38 occupy positions on opposite sides of port 31, port 31 is connected around annular recess 42 to return flow port 32. Return flow port 33 is cut off from the system by flange 39, occupying a position between this port and port 29. Pressure fluid in annular recess 43 is communicated through openings 56 to slide valve bore 55 and from bore 55 has access through openings 54 to the peripheral ring seal recesses 53. Within these recesses, as shown in Fig. 3, the pressure fluid acts on the ring seals 46 to expand them radially into contact with the wall of bore 27.

Figure 2:
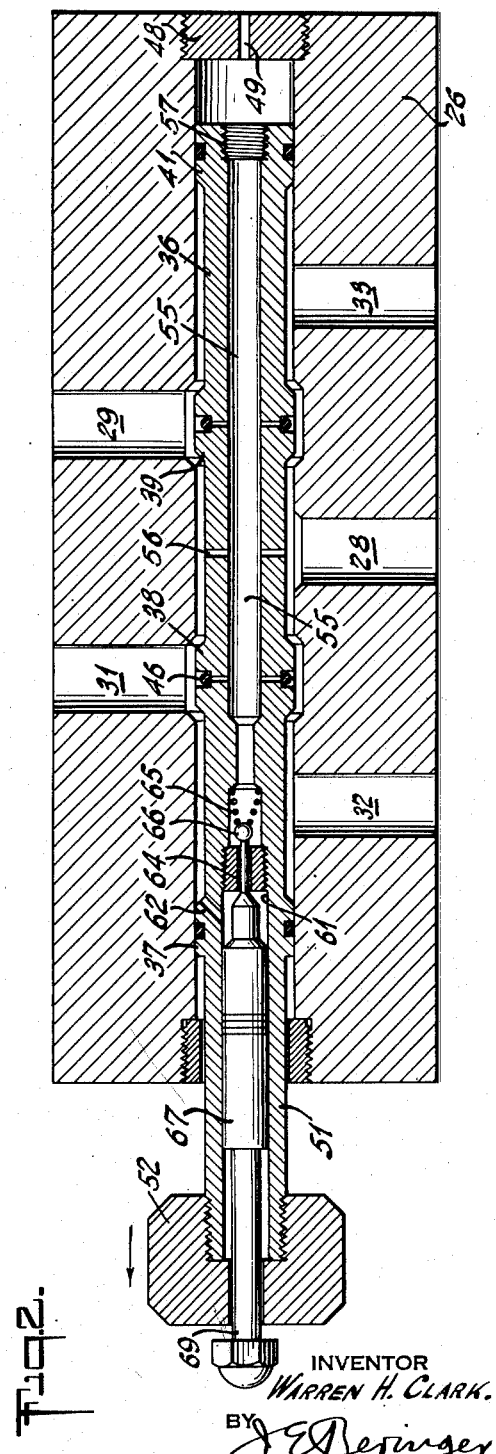
Fig. 2 is a view similar to Fig. 1 showing the valve being moved from the position of Fig. 1, with the ring seals retracted.

In shifting the valve 36 from the position of Fig. 1 to and through the position of Fig. 2, push rod 69 is first shifted inward to unseat ball valve 66. A flow of fluid out of bore 55 accordingly takes place, reducing the pressure in recesses 53 and allowing the ring seals 46 to contract to the position shown in Fig. 4. With the pressure on the ring seals so relieved, knob 52 is pulled to shift the slide valve to the reverse of the position shown in Fig. 1, Fig. 2 illustrating the valve midway in this movement. In the reverse position, therefore, flanges 38 and 39 occupy positions on opposite sides of port 31 while flanges 39 and 41 occupy positions on opposite sides of port 29. Accordingly, port 31 is now connected around annular recess 43 to high pressure port 28, and port 29 is connected around annular recess 44 to return flow port 33. Return flow port 32 is cut off from the system except that it continues to communicate around annular recess 42 with escape opening 62. When the slide valve has been so positioned push rod 69 is released, allowing ball valve 66 to close, whereupon pressure again builds up in bore 55 and in recesses 53 to reexpand the ring seals 46. In returning the valve to the position of Fig. 1, the same operations take place, rod 69 being first actuated, followed by return movement of the slide valve and then release of the rod 69.

Thus, in the operation of the slide valve each shifting motion of the valve is preceded by actuation of the push rod 69 and followed by a release of the push rod to effect, respectively, a contraction and expansion of the ring seals 46. It will be observed that the push rod 69 and knob 52 are so physically associated that one hand of the operator may encompass both elements for easy sequential operation thereof.

Concerning the release of pressure in bore 55, it will be noted that the pressure fluid escape route is through bore 64, chamber 61, opening 62 and annular recess 42 to return flow port 32, recess 42 being continuously connected to port 32 as has been seen. For rapid release of pressure in the bore 55, the inlet 56 thereto should be materially smaller in area than the escape route opened by the unseating of ball valve 66. This will insure a pressure drop across inlet 56 adequate to allow seals 46 to retract into recesses 53.

The ring seals 46, it will be understood are made of a resilient rubber or rubber-like material capable of repeated stretching and contraction without deterioration. The recesses 53, receiving seals 46, are relatively deep as before noted and also are somewhat narrower than is conventional in order to maintain an axial tension on the seals. Pressure applied beneath the ring seals stretches or expands them radially. When this pressure is relieved, the seals, due to their elasticity, sink into the recesses 53 and allow the slide valve to move freely over the ports 28—33, in the installation of the valve and during operation thereof, without possibility of cutting the seals. The radial tension of the expanded seals upon the wall of bore 27 also provides a force useful in resisting inadvertent shifting of the slide valve. This force likewise is relieved with release of pressure in bore 55, allowing easy sliding movement of the valve.

What is claimed is:

1. A valve unit, including a body presenting a bore and a plurality of pressure fluid flowing ports communicating with said bore, a slide valve reciprocable in said bore between operating positions selectively to interconnect said ports, elastic ring seals recessed in the periphery of said slide valve normally beneath the surface thereof, means for applying fluid pressures to said ring seals to expand them outwardly to contact the wall of the bore when the valve is in said operating positions, and means for rendering said last named means alternatively effective and ineffective in each operating position of said slide valve and operable simultaneously upon said ring seals in each operating position of said slide valve.

2. A valve unit, including a body presenting a bore and a plurality of pressure fluid flowing ports communicating with said bore, a slide valve reciprocable in said bore between operating position positions selectively to interconnect said ports, an extension on said slide valve projecting outside said bore for manual adjustment of said valve, ring seals recessed in the periphery of said slide valve and expansible into contact with the wall of said bore when the valve is in said operating positions, pressure fluid means for expanding said ring seals, and a control for said pressure fluid means extending outside said bore in physical association with said valve extension for manual actuation in conjunction with adjustment of said valve, said control being effective in each operating position of said slide valve.

3. A valve unit, including a body presenting a bore and high and low fluid pressure ports opening into said bore, a reciprocable piston valve in said bore settable between operating positions to control flow between said ports, an elastic ring seal recessed in the periphery of said valve normally beneath the surface thereof, means for applying pressure fluid beneath said ring seal to expand it into contact with the wall of said bore when the valve is in said operating positions, and control means accessible from outside said body for establishing and discontinuing the application of pressure fluid to said ring seal in each operating position of said slide valve.

4. A valve unit, including a body presenting a bore and a plurality of pressure fluid flowing ports opening into said bore, one of said ports representing a pressure fluid inlet, a slide valve reciprocable in said bore to positions of adjustment selectively interconnecting said ports, ring seals recessed in the periphery of said slide valve at spaced apart points along the length thereof, a longitudinal bore in said slide valve, a radial opening in said slide valve continuously communicating said longitudinal bore with said inlet port, and other radial openings in said slide valve for transmitting pressure fluid admitted to said longitudinal bore to the underside of said ring seals to expand said seals against the wall of said bore, and outlet opening from said longitudinal bore, and a valve accessible from outside the body for opening and closing said outlet.

5. In a valve unit for selectively interconnecting a pressure fluid source with pressure fluid conducting passageways, a slide valve movable axially to a plurality of operating positions, a plurality of relatively deep circumferential recesses at spaced points in the periphery of said slide valve, an expansible ring seal in each said recess having a thickness less than the depth of said recesses, means for admitting pressure fluid from said source to said recesses to expand said seals outward, and control means selectively operable to discontinue the application of fluid pressure to said ring seals in each operating position of said slide valve and operable simultaneously upon said ring seals in each operating position of said slide valve.

6. In a valve unit for selectively interconnecting a pressure fluid source with pressure fluid conducting passageways, a slide valve movable axially to a plurality of control positions, expansible ring seals recessed in said slide valve at spaced points along the periphery thereof, means for admitting pressure fluid to the undersides of said ring seals to expand them outward, said means including a longitudinal bore in said slide valve continuously communicating with the pressure fluid source, a pressure fluid escape port from said longitudinal bore, and reciprocable means having a bearing in said slide valve for controlling the opening and closing of said escape port.

7. A valve unit according to claim 6, characterized by an extension on said slide valve providing a bearing for said reciprocable means and a handle for adjustment of said slide valve, said adjustment of said slide valve, said extension and said reciprocable means being thus physically associated for opening of said escape port prior to adjustment of the slide valve and closing of said escape port subsequent to adjustment of the slide valve.

8. A four way hydraulic valve or like device, including a body presenting a bore open at one end and further presenting a pressure fluid inlet port, return flow ports and other ports to be alternately connected to said pressure fluid inlet port and said return flow ports, all said ports opening into said bore, a slide valve reciprocably mounted in said bore selectively to interconnect said ports, peripheral spaced apart recesses in said slide valve, ring seals recessed in said recesses, means including a longitudinal passage in said slide valve communicating with said pressure fluid inlet for admitting pressure fluid to said recesses to expand said ring seals into contact with the wall of said bore, a valve for controlling the pressure in said longitudinal passage, and a plunger for actuation of said valve having a bearing in said slide valve and extending out the open end of said bore for manual actuation.

9. A valve device according to claim 8, characterized by an extension on said slide valve in telescoping relation to said plunger and providing a handle for adjustment of said slide valve, said extension and said plunger being thus physically associated for release of the pressure in said longitudinal passage prior to and during adjustment of the slide valve and establishing of such pressure subsequent to adjustment of the slide valve.

10. A valve unit, including a body presenting an elongated valve bore, a slide valve movable axially in said bore to a plurality of positions of adjustment corresponding to operating positions, spaced apart expansible ring seals recessed in the periphery of said slide valve normally beneath the surface thereof, and alternatively operable means for expanding said ring seals simultaneously in each operating position of said slide valve into tight contact with the wall of said bore to provide both a tight seal and a yielding detention of said slide valve in a selected operating position.

11. A valve unit, including a body presenting an elongated valve bore, a slide valve movable axially in said bore to a plurality of positions of adjustment corresponding to operating positions, means accessible from outside said body for adjusting said valve, spaced apart expansible ring seals recessed in the periphery of said slide valve, means for expanding said ring seals into tight contact with the wall of said bore when said valve is in operating positions to provide both a tight seal and a yielding detention of said valve in a selected position of adjustment, and control means physically associated with said adjusting means for synchronous operation for rendering said expanding means alternatively effective and ineffective in each operating position of said slide valve and operable simultaneously upon said ring seals in each operating position of said slide valve.

References Cited in the file of this patent

UNITED STATES PATENTS

| Number | Name | Date |
|---|---|---|
| 331,789 | Harvey | Dec. 8, 1885 |
| 1,213,582 | Brown | Jan. 23, 1917 |
| 2,073,481 | Kinzie | Mar. 9, 1937 |
| 2,506,111 | Saint | May 2, 1950 |
| 2,510,617 | Barr | June 6, 1950 |

FOREIGN PATENTS

| Number | Country | Date |
|---|---|---|
| 678,371 | France | of 1929 |